(12) United States Patent
Lee

(10) Patent No.: US 12,034,795 B2
(45) Date of Patent: Jul. 9, 2024

(54) REMOTE PAIRING DEVICE AND METHOD

(71) Applicant: Acer Incorporated, New Taipei (TW)

(72) Inventor: Chun-Hua Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 254 days.

(21) Appl. No.: 17/399,179

(22) Filed: Aug. 11, 2021

(65) Prior Publication Data

US 2022/0321637 A1    Oct. 6, 2022

(30) Foreign Application Priority Data

Mar. 31, 2021 (TW) ................................. 110111871

(51) Int. Cl.
| | | |
|---|---|---|
| *H04L 67/025* | (2022.01) | |
| *G06F 11/30* | (2006.01) | |
| *H04L 67/2871* | (2022.01) | |
| *H04L 67/303* | (2022.01) | |
| *H04L 67/51* | (2022.01) | |

(52) U.S. Cl.
CPC ........ *H04L 67/025* (2013.01); *G06F 11/3089* (2013.01); *H04L 67/2871* (2013.01); *H04L 67/303* (2013.01); *H04L 67/51* (2022.05)

(58) Field of Classification Search
CPC . H04L 67/025; H04L 67/2871; H04L 67/303; H04L 67/51; H04L 41/0893; H04L 43/0817; H04L 41/12; G06F 11/3089; G06F 9/4401; G06F 9/442; G06F 11/3006; G06F 11/3051; G06F 1/24; G06F 9/542

See application file for complete search history.

(56) References Cited

U.S. PATENT DOCUMENTS

| | | | |
|---|---|---|---|
| 9,928,151 B1 * | 3/2018 | Rodriguez Valadez | ..................... G06F 11/26 |
| 10,007,505 B2 * | 6/2018 | Thapar | ..................... G06F 8/656 |
| 2003/0226059 A1 * | 12/2003 | Braun | ................. G06F 11/0775 714/E11.179 |
| 2007/0260912 A1 * | 11/2007 | Hatasaki | ............. G06F 11/2046 714/E11.023 |

(Continued)

FOREIGN PATENT DOCUMENTS

| | | | | |
|---|---|---|---|---|
| CN | 109557993 B | * | 6/2020 | ............... G06F 1/24 |
| CN | 110673710 B | * | 6/2021 | ............... G06F 1/24 |

*Primary Examiner* — Eyob Hagos
(74) *Attorney, Agent, or Firm* — McClure, Qualey & Rodack, LLP

(57) ABSTRACT

A remote pairing device is provided. The remote paring device includes a processor to execute the following steps. A plurality of controlled elements is divided into a restart group and a force-shutdown group. Each of the controlled elements is connected to an electronic device. A restart command is sent to the controlled elements in the restart group. A force-shutdown command is sent to the controlled elements in the force-shutdown group. The pairing candidate lists each corresponding to the controlled elements are updated according to the connection status corresponding to the electronic devices received during a specific time period after sending the restart command or the force-shutdown command. Determining that the controlled elements corresponding to the pairing candidates list having only one electronic device therein are successfully paired.

4 Claims, 3 Drawing Sheets

(56) References Cited

U.S. PATENT DOCUMENTS

| | | | | |
|---|---|---|---|---|
| 2012/0047404 | A1* | 2/2012 | Peng | G06F 1/28 |
| | | | | 714/48 |
| 2013/0179672 | A1* | 7/2013 | Lee | G06F 1/26 |
| | | | | 713/2 |
| 2014/0379104 | A1* | 12/2014 | Hu | G06F 9/4405 |
| | | | | 700/90 |
| 2016/0149790 | A1* | 5/2016 | Zimmermann | G06F 9/45558 |
| | | | | 709/224 |
| 2017/0235622 | A1* | 8/2017 | Boyapalle | G06F 11/3065 |
| | | | | 714/47.2 |
| 2020/0210261 | A1* | 7/2020 | Reddy | G06F 21/70 |
| 2022/0147018 | A1* | 5/2022 | Cooley | G06F 16/583 |

* cited by examiner

203

```
┌─────────────────────────────────────┐
│ Determine whether the connection    │
│ status corresponding to the         │
│ electronic devices point to the     │──301
│ restart operation or the            │
│ force-shutdown operation            │
└─────────────────────────────────────┘
                  ↓
┌─────────────────────────────────────┐
│ Remove the electronic devices each  │
│ corresponding to the connection     │
│ status not pointing to the restart  │
│ operation from the pairing          │
│ candidate lists each corresponding  │
│ to the controlled elements in the   │
│ restart group, and remove the       │──302
│ electronic devices each             │
│ corresponding to the connection     │
│ status not pointing to the          │
│ force-shutdown operation from the   │
│ pairing candidate lists each        │
│ corresponding to the controlled     │
│ elements in the force-shutdown group│
└─────────────────────────────────────┘
```

FIG. 3

REMOTE PAIRING DEVICE AND METHOD

CROSS REFERENCE TO RELATED APPLICATIONS

This application claims priority of Taiwan Patent Application No. 110111871, filed on Mar. 31, 2021, the entirety of which is incorporated by reference herein.

BACKGROUND OF THE INVENTION

Field of the Invention

The present disclosure is related to a pairing device and method, and in particular it is related to a remote pairing device and method.

Description of the Related Art

Nowadays, there is a need for many enterprises to boot or shutdown their remote electronic devices. The uncertainty of network stability occasionally results in an inability to remotely control these electronic devices. Furthermore, when an electronic device crashes, users may not be able to perform a restart operation on it. In order to solve the problems described above, some firms may provide an additional element for the electronic device. Directly performing the booting or shutdown operation on an electronic device from the hardware site is allowed by setting up a controlled element on the mainboard of the electronic device and connecting the controlled element to the power pins of the mainboard. In addition, the controlled element itself may have independent network connection capability, so that the controlled element and the electronic device can use different networks. This provides a redundancy option for the remote-control site to perform the booting or shutdown operation on the electronic device via another network when the electronic device is disconnected.

However, since the controlled element and the electronic device use different networks, and there is no connection between the controlled element and the electronic device other than the power pins. Hence, this raises a problem that needs to be solved: when there are multiple controlled elements each set up on multiple electronic devices, how does the control site figure out the pairing relationship between these controlled elements and the electronic devices?

BRIEF SUMMARY OF THE INVENTION

In order to overcome the problem described above, the present disclosure provides a remote pairing device and method, allowing the remote site to figure out the pairing relationship between the controlled elements and the electronic devices.

An embodiment of the present disclosure provides a remote pairing device, including a processor. The processor executes the following tasks. A plurality of controlled elements is divided into a restart group and a force-shutdown group. The controlled elements are each connected to a plurality of electronic devices. A restart command is sent to the controlled elements in the restart group, to cause the controlled elements in the restart group to perform a restart operation on the electronic devices connected thereto. A force-shutdown command is sent to the controlled elements in the force-shutdown group, to cause the controlled elements in the force-shutdown group to perform a force-shutdown operation on the electronic devices connected thereto. A plurality of pairing candidate lists each corresponding to the controlled elements is updated according to a plurality of connection statuses each corresponding to the electronic devices received during a specific time period after sending the restart command or the force-shutdown command. A determination is made that the controlled elements corresponding to the pairing candidates lists having only one of the electronic devices therein are successfully-paired The above steps are repeated until all of the controlled elements are successfully paired.

In some embodiments, the step of updating the pairing candidate lists each corresponding to the controlled elements according to the connection status each corresponding to the electronic devices received during the specific time period after sending the restart command or the force-shutdown command includes the following steps. It is determined whether each of the connection statuses corresponding to each of the electronic devices points to a restart operation or a force-shutdown operation. The electronic devices each corresponding to the connection status that do not point to a restart operation are removed from the pairing candidate lists each corresponding to the controlled elements in the restart group. The electronic devices each corresponding to the connection status that do not point to a force-shutdown operation are removed from the pairing candidate lists each corresponding to the controlled elements in the force-shutdown group.

In some embodiments, each connection status that points to a restart operation includes an online notification and an offline notification. Each connection status that points to a force-shutdown operation includes an unknown notification, and does not include the online notification or the offline notification.

In some embodiments, the processor further executes the following steps. It removes the only electronic device in the pairing candidate lists corresponding to the controlled elements that has successfully paired from the pairing candidate lists having a plurality of the electronic devices therein. It rules out the controlled elements that have successfully paired from subsequent calculations.

In some embodiments, the electronic device and the controlled element communicate with the remote pairing device via different networks.

In addition, an embodiment of the present disclosure provides a remote pairing method, including the following steps. A plurality of controlled elements is divided into a restart group and a force-shutdown group. The controlled elements are each connected to a plurality of electronic devices. A restart command is sent to the controlled elements in the restart group, to cause the controlled elements in the restart group to perform a restart operation on the electronic devices connected to the controlled elements in the restart group. A force-shutdown command is sent to the controlled elements in the force-shutdown group, to cause the controlled elements in the force-shutdown group to perform a force-shutdown operation on the electronic devices connected to the controlled elements in the force-shutdown group. A plurality of pairing candidate lists each corresponding to the controlled elements are updated according to a plurality of connection statuses each corresponding to the electronic devices received during a specific time period after sending the restart command or the force-shutdown command. A determination is made that the controlled elements corresponding to the pairing candidates lists having only one of the electronic devices therein are successfully-paired. The above steps are repeated until all of the controlled elements are successfully paired.

In some embodiments, the remote pairing method further includes the following steps. The only electronic device in the pairing candidate lists corresponding to the controlled elements that is successfully paired is removed from the pairing candidate lists having a plurality of the electronic devices therein. The controlled elements that have successfully paired are ruled out from subsequent calculations.

The remote pairing device and method provided by the present disclosure allows the remote control site to figure out the pairing relationship between these controlled elements and the electronic devices when there are multiple controlled elements and multiple electronic devices, so that the control commands from the remote site are transmitted to the correct electronic devices.

BRIEF DESCRIPTION OF THE DRAWINGS

The present disclosure can be more fully understood by reading the subsequent detailed description and examples with references made to the accompanying drawings, wherein:

FIG. 3 illustrates a flow diagram of an embodiment of the step 203 in FIG. 2.

DETAILED DESCRIPTION OF THE INVENTION

Figure 1:
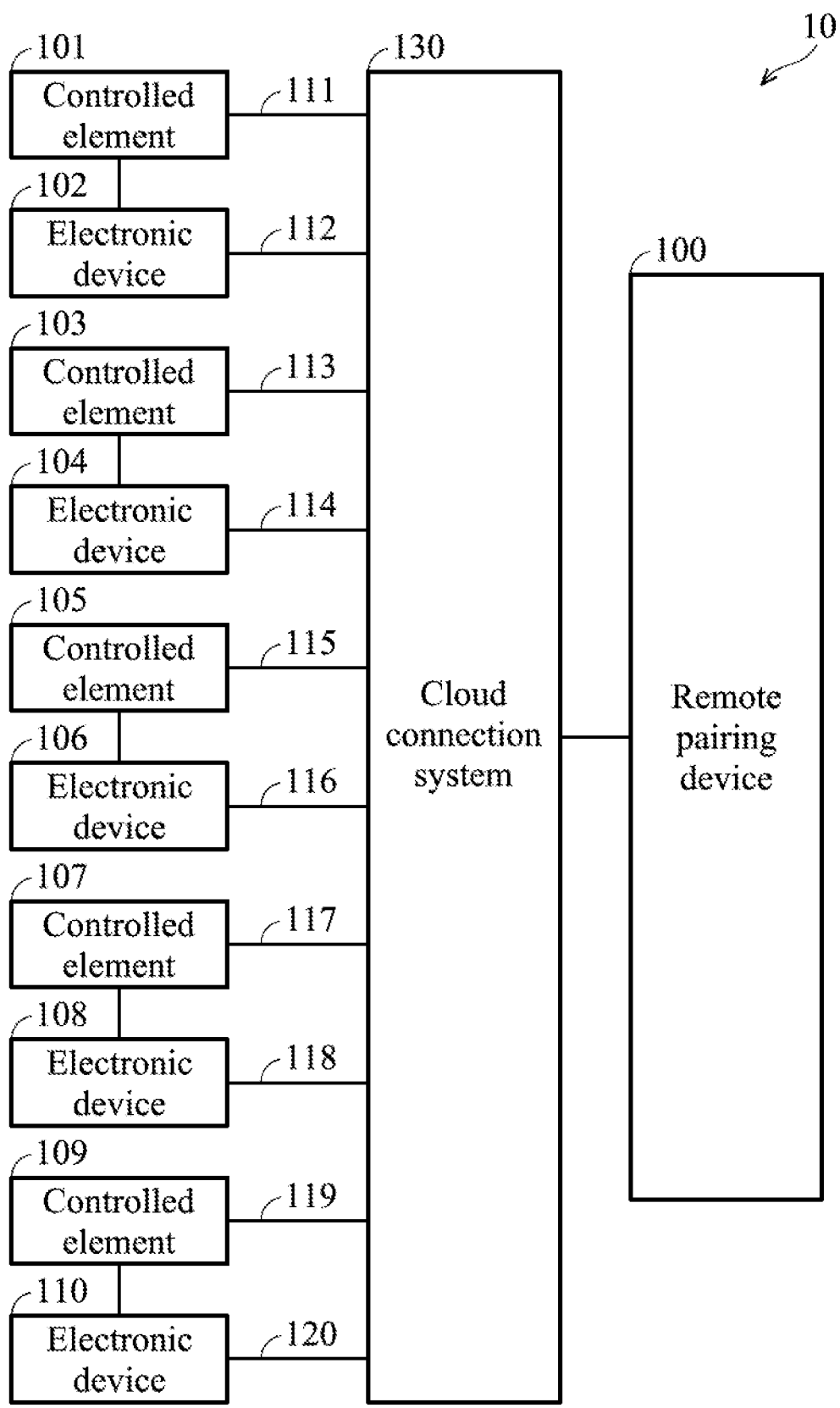
FIG. 1 illustrates a network architecture diagram of a communication environment 10 in which an exemplary remote pairing device 100 is operating, according to an embodiment of the present disclosure.

FIG. 1 illustrates a network architecture diagram of a communication environment 10 in which an exemplary remote pairing device 100 is operating, according to an embodiment of the present disclosure. As shown in FIG. 1, the communication environment 10 includes not only the remote pairing device 100, but also a controlled element 101, a controlled element 103, a controlled element 105, a controlled element 107, a controlled element 109, an electronic device 102, an electronic device 104, an electronic device 106, an electronic device 108, an electronic device 110, and a cloud connection system 130. In the communication environment 10, the controlled element 101, the controlled element 103, the controlled element 105, the controlled element 107, and the controlled element 109 are respectively connected to the cloud connection system 130 via a network 111, a network 113, a network 115, a network 117, and a network 119. The electronic device 102, the electronic device 104, the electronic device 106, the electronic device 108, and the electronic device 110 are respectively connected to the cloud connection system 130 via a network 112, a network 114, a network 116, a network 118, and a network 120. The controlled element 101, the controlled element 103, the controlled element 105, the controlled element 107, and the controlled element 109 are respectively set up on the mainboard (not shown in FIG. 1) of the electronic device 102, the electronic device 104, the electronic device 106, the electronic device 108, and electronic device 110, and connected to the power pins of the mainboard. The cloud connection system 130 is connected to the remote pairing device 100 by wire or wirelessly.

According to an embodiment of the present disclosure, the electronic device 102, the electronic device 104, the electronic device 106, the electronic device 108, the electronic device 110, and the remote pairing device 100 in the communication environment 10 can be any device that includes a processor (not shown in FIG. 1) and communicates with other devices through a network, such as various desktops, laptops, servers, mobile devices, workstations, or terminals. The processor can be any device that is used for executing commands, such as a CPU, a microprocessor, a controller, a microcontroller, or a state machine, although embodiments of the present disclosure are not limited thereto.

According to an embodiment of the present disclosure, the cloud connection system 130 in the communication environment 10 can be a cloud infrastructure such as a private cloud, a public cloud, and/or a mixed cloud. The cloud connection system 130 may include one or more computerized devices, and each computerized device may include hardware elements that are electrically coupled via bus. The hardware elements may include at least one central processing unit (CPU), at least one input device (such as a mouse, a keyboard, a touch screen, or a small keyboard), and at least one output device (such as a display device, a printer, or a loudspeaker). The cloud connection system 130 may also include one or more storage devices, such as disk drivers, optical storage elements, and solid-state storage devices like random access memory (RAM), read-only memory (ROM), removable media devices, memory cards, flash memory cards, etc.

According to an embodiment of the present disclosure, the network 111-120 can be, for example, a local area network (LAN), a wide area network (WAN), a virtual private network, the Internet, an intranet, an extranet, a public switched telephone network, an infrared network, a wireless network, and/or any combination thereof.

According to an embodiment of the present disclosure, each of the controlled element 101, the controlled element 103, the controlled element 105, the controlled element 107, and the controlled element 109 in the communication environment 10 can be an external power that includes a rechargeable battery, and can be set up on the mainboard of the electronic device. By connecting to the power pins of the mainboard of each electronic device, the controlled element 101, the controlled element 103, the controlled element 105, the controlled element 107, and the controlled element 109 are allowed to directly perform the booting or shutdown operation on the electronic device 102, the electronic device 104, the electronic device 106, the electronic device 108, and the electronic device 110 connected thereto respectively. The controlled element 101, the controlled element 103, the controlled element 105, the controlled element 107, and the controlled element 109 further have network connection capability, allowing receiving the control command from the remote site (e.g., the remote pairing device 100) through the network 111, the network 113, the network 115, the network 117, and the network 119.

According to an embodiment of the present disclosure, the cloud connection system in the communication environment 10 may collect the connection information returned by the electronic device 102, the electronic device 104, the electronic device 106, the electronic device 108, and the electronic device 110, via the network 112, the network 114, the network 116, the network 118, and the network 120 respectively. The cloud connection system 130 may send a status notification corresponding to each of the electronic devices based on the connection information returned by each of the electronic devices. In some embodiments, in response to the electronic device 102 having just connected to the cloud connection system 130 (e.g., booting), the cloud connection system 130 will send an online notice corresponding to the electronic device 102 to the remote pairing device 100. In response to the electronic device 102 voluntarily disconnecting from the cloud connection system 130 (e.g., normal shutdown), the cloud connection system 130 will send an offline notification corresponding to the electronic device 102 to the remote pairing device 100. In response to the electronic device 102 involuntarily disconnecting from the cloud connection system 130 (e.g., abnormal shutdown, system failure, or the network wire being unplugged), the cloud connection system 130 will send an unknown notification corresponding to the electronic device 102 to the remote pairing device 100 after a first specific time period (e.g., one minute, although embodiments of the present disclosure are not limited thereto) from when the disconnection happens. For any electronic devices in the communication environment 10 other than the electronic device 102, such as the electronic device 104, the electronic device 106, the electronic device 108, the electronic device 110, and/or other electronic devices that are not shown in FIG. 1, the behavior of the cloud connection system 130 is the same as described above. Thus, the remote pairing device 100 can figure out the connection status of each electronic device based on the status notification that has been received.

As previously described, for the present application, the problem to be overcome is how the control site figure out the pairing relationship between the controlled elements and the electronic devices when there are multiple controlled elements each set up on the corresponding one of multiple electronic devices. For example, how does the control site (i.e., the remote pairing device 100) figure out that the controlled element 101, the controlled element 103, the controlled element 105, the controlled element 107, and the controlled element 109 are connected to the electronic device 102, the electronic device 104, the electronic device 106, the electronic device 108, and the electronic device 110 respectively in the communication environment 10.

The remote pairing device 100 provided by the present disclosure may send a restart command or a force-shutdown command to the controlled element of each electronic device in the communication environment 10, and thereby filter a pairing candidate list (i.e., the list of all the electronic devices that are possible to be connected with the controlled element) corresponding to each controlled element according to the connection status corresponding to each controlled element that is received during a second specific time period (e.g., three minutes, although embodiments of the present disclosure are not limited thereto, as long as the second specific time period is longer than the first specific time period) after sending the restart command or the force-shutdown command. After filtering the pairing candidate list for sufficient number of times, the electronic device connected to each controlled element will be figured out.

For example, the remote pairing device 100 may send the restart command to the controlled element 101, to cause the controlled element 101 to perform a restart operation on the electronic device 102. In other words, the electronic device will shut down first, and then boot again. In response to the electronic device 102 shutting down, the remote pairing device 100 will receive the offline notification corresponding to the electronic device 102. In response to the electronic device 102 booting up, the remote pairing device 100 will also receive an online notification corresponding to the electronic device 102. The remote pairing device 100 may then remove the electronic devices corresponding to the connection status (which does not include an online notification and an offline notification) received during the second specific time period (e.g., three minutes) after sending the restart command from the pairing candidate list corresponding to the controlled element 101. This is because the electronic devices corresponding to the connection status (that does not include an online notification and an offline notification) have not restarted during the second specific time period, and so they can't be the electronic device connected to the controlled element 101.

In another example, the remote pairing device 100 may send the force-shutdown command to the controlled element 103, to cause the controlled element 103 to perform a force-shutdown operation on the electronic device 104. In response to the electronic device 104 shutting down, the remote pairing device 100 will receive the unknown notification corresponding to the electronic device 104 after the first specific time period (e.g., one minute). The remote pairing device 100 may then remove the electronic devices corresponding to the connection status received during the second specific time period (e.g., three minutes) after sending the force-shutdown command that do not include the unknown notification and that includes the online notification or the offline notification from the pairing candidate list corresponding to the controlled element 103. This is because the electronic devices corresponding to the connection status not including the unknown notification have not been force shutdown during the second specific time period, and so they can't be the electronic device connected to the controlled element 103. Also, the electronic devices corresponding to the connection status including the online notification or the offline notification can't be the electronic device connected to the controlled element 103, because the electronic devices are not possible to have the booting behavior or the shutdown behavior during the second specific time period after being shut down.

Figure 2:
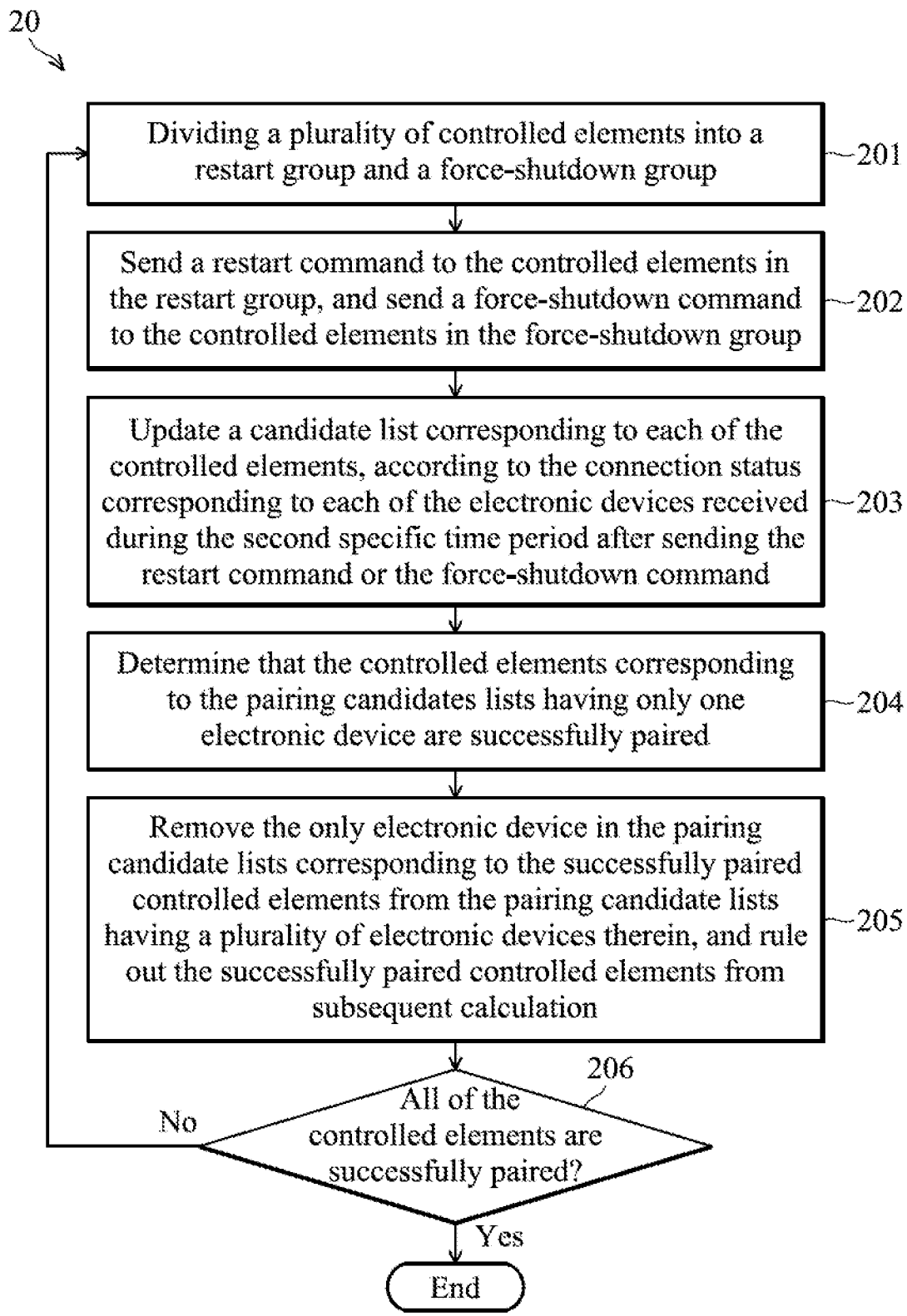
FIG. 2 illustrates a flow diagram of a remote pairing method 20 executed by the remote pairing device 100 in FIG. 1, according to an embodiment of the present disclosure.

FIG. 2 illustrates a flow diagram of a remote pairing method 20 executed by the remote pairing device 100 in FIG. 1, according to an embodiment of the present disclosure. As shown in FIG. 2, the remote pairing method 20 includes steps 201-206.

The remote pairing method 20 starts from step 201. In step 201, a plurality of controlled elements are divided into a restart group and a force-shutdown group, wherein the each of the controlled elements is connected to an electronic device. Then, the remote pairing method 20 proceeds to step 202.

In step 202, a restart command is sent to the controlled elements in the restart group, to cause the controlled elements in the restart group to perform a restart operation on the electronic devices connected to the controlled elements in the restart group; and a force-shutdown command is sent to the controlled elements in the force-shutdown group, to cause the controlled elements in the force-shutdown group to perform a force-shutdown operation on the electronic devices connected to the controlled elements in the force-shutdown group. Then, the remote pairing method 20 proceeds to step 203.

In step 203, a candidate list corresponding to each of the controlled elements is updated, according to the connection status corresponding to each of the electronic devices received during the second specific time period after sending the restart command or the force-shutdown command. Each candidate list may have one or more electronic devices. Then, the remote pairing method 20 proceeds to step 204.

In step 204, the controlled elements corresponding to the pairing candidates lists having only one electronic device are determined to be successfully paired. Then, the remote pairing method 20 proceeds to step 205.

In step 205, the only electronic device in the pairing candidate lists corresponding to the successfully paired controlled elements is removed from the pairing candidate lists having a plurality of the electronic devices therein, and the successfully paired controlled elements are ruled out from subsequent calculation. Then, the remote pairing method 20 proceeds to step 206.

In step 206, a check is made whether all of the controlled elements are successfully paired. In other words, it is checked whether all of the controlled elements are ruled out from subsequent calculation. If yes, then the remote pairing method 20 ends. If not, it is indicated that there are controlled elements that have not been successfully paired yet, and the remote pairing method 20 returns to step 201.

FIG. 3 illustrates a flow diagram of an embodiment of the step 203 in FIG. 2. As shown in FIG. 3, the embodiment of FIG. 3 may include step 301 and step 302.

The embodiment of step 203 starts from step 301. In step 301, whether the connection status corresponding to the electronic devices point to the restart operation or the force-shutdown operation is determined. Then, the embodiment of step 203 proceeds to step 302.

In step 302, the electronic devices corresponding to the connection status not pointing to the restart operation are removed from the pairing candidate lists corresponding to the controlled elements in the restart group, and the electronic devices corresponding to the connection status not pointing to the force-shutdown operation are removed from the pairing candidate lists corresponding to the controlled elements in the force-shutdown group.

In some embodiments, the connection status pointing to the restart operation must include the online notification and the offline notification at the same time. In other words, in step 302, each connection status of the electronic devices removed from the pairing candidate lists corresponding to the controlled elements in the restart group does not include the online notification and the offline notification at the same time.

In some embodiments, the connection status pointing to the force-shutdown operation must include the unknown notification, and must not include the online notification or the offline notification. In other words, in step 302, each connection status of the electronic devices removed from the pairing candidate lists corresponding to the controlled elements in the force-shutdown group may include the online notification or the offline notification, or may not include the unknown notification.

The following description will take the communication environment 10 illustrated in FIG. 1 as an example to elaborate on the process of using the method 20 illustrated in FIG. 2 to pair each of the controlled elements and each of the electronic devices. In this example, it is assumed that in the communication environment 10, there are 100 electronic devices (not all of these devices are shown in FIG. 1) connected to the cloud connection system 130, and the controlled elements to be paired are the controlled element 101, the controlled element 103, the controlled element 105, the controlled element 107, and the controlled element 109 in FIG. 1. It should be appreciated that although the controlled elements to be paired are shown to be connected to the electronic device 102, the electronic device 104, the electronic device 106, the electronic device 108, and the electronic device 110 respectively in FIG. 1, it is only for readers to readily understand the actual paring relationship between the controlled elements and the electronic devices. In this example, it is assumed that the remote pairing device 100 does not know the pairing relationship between the controlled elements and the electronic devices yet, until the method 20 is completed.

First, the remote pairing device may send the restart command to the controlled element 101, the controlled element 103, the controlled element 105, the controlled element 107, and the controlled element 109, to cause the controlled element 101, the controlled element 103, the controlled element 105, the controlled element 107, and the controlled element 109 performs the restart operation on the electronic device 102, the electronic device 104, the electronic device 106, the electronic device 108, and the electronic device 110 respectively, and then observe the connection status received during the second specific time period (e.g., three minutes) after sending the restart command, so as to determine the pairing candidate lists each corresponding to the controlled element 101, the controlled element 103, the controlled element 105, the controlled element 107, and the controlled element 109. Among the 100 electronic devices, the electronic devices corresponding to the connection status not pointing to the restart operation can't be the one paired with the controlled element 101, the controlled element 103, the controlled element 105, the controlled element 107, or the controlled element 109, so they will not be listed in the pairing candidate lists each corresponding to the controlled elements. It is assumed hereby that among the 100 electronic devices, besides the electronic device 102, the electronic device 104, the electronic device 106, the electronic device 108, and the electronic device 110, the electronic device A and the electronic device B also happen to restart soon after the remote pairing device 100 sends the restart command. At this moment, the pairing candidate lists each corresponding to the controlled element 101, the controlled element 103, the controlled element 105, the controlled element 107, and the controlled element 109 are as shown in Table I below.

TABLE I

| Controlled Element | Paring Candidate List |
| --- | --- |
| controlled element 101 | electronic device 102, electronic device 104, electronic device 106, electronic device 108, electronic device 110, electronic device A, electronic device B |
| controlled element 103 | electronic device 102, electronic device 104, electronic device 106, electronic device 108, electronic device 110, electronic device A, electronic device B |
| controlled element 105 | electronic device 102, electronic device 104, electronic device 106, electronic device 108, electronic device 110, electronic device A, electronic device B |
| controlled element 107 | electronic device 102, electronic device 104, electronic device 106, electronic device 108, electronic device 110, electronic device A, electronic device B |
| controlled element 109 | electronic device 102, electronic device 104, electronic device 106, electronic device 108, electronic device 110, electronic device A, electronic device B |

Then, in step 201, the controlled element 101, the controlled element 103, the controlled element 105, the controlled element 107, and the controlled element 109 are sorted into the restart group or the force-shutdown group. In this embodiment, based on the order of "controlled element 101, controlled element 103, controlled element 105, controlled element 107, controlled element 109", the controlled element 101 at the first, the controlled element 105 at the third, and the controlled element 109 at the fifth are assigned to the restart group, while the controlled element 103 at the second order and the controlled element 207 at the fourth order are assigned to the force-shutdown group. Then, the method proceeds to step 202.

In step 202, the remote pairing device 100 will send the restart command to the controlled element 101, the controlled element 105, and the controlled element 109 in the restart group, to cause the controlled element 101, the controlled element 105, and the controlled element 109 to perform the restart operation on the electronic device 102, the electronic device 106, and the electronic device 110 connected thereto respectively. The remote pairing device 100 will send the force-shutdown command to the controlled element 103 and the controlled element 107 in the force-shutdown group, to cause the controlled element 103 and the controlled element 107 to perform the force-shutdown operation on the electronic device 104 and the electronic device 108 connected thereto respectively. Then, the method proceeds to step 203.

During the second specific time period after sending the commands, the connection status corresponding to the electronic device 102, the electronic device 106, and the electronic device 110 received by the remote pairing device 100 will point to the restart operation but not the force-shutdown operation, while the connection status corresponding to the electronic device 104 and the electronic device 108 received by the remote pairing device 100 will point to the force-shutdown operation but not the restart operation. In view of the above, in step 203, the electronic device 104 and the electronic device 108 of which the connection status not pointing to the restart operation will be removed from the pairing candidate lists each corresponding to the controlled element 101, the controlled element 105, and the controlled element 109 in the restart group, while the electronic device 102, the electronic device 106, and the electronic device 110 of which the connection status not pointing to the force-shutdown operation will be removed from the pairing candidate lists each corresponding to controlled element 103 and the controlled element 107 in the force-shutdown group. Besides, since the electronic device A and the electronic device B is not connected to any of the controlled element 101, the controlled element 103, the controlled element 105, the controlled element 107, and the controlled element 109, these controlled elements will not cause the electronic device A and the electronic device B to restart or to force shut down. Furthermore, it is assumed hereby that the electronic device A and the electronic device B does not restart or force shut down for other reasons during the second specific time period, and thus the connection status corresponding to them will not point to the restart operation or the force-shutdown operation, so the electronic device A and the electronic device B will be removed from the pairing candidate lists each corresponding to the controlled element 101, the controlled element 103, the controlled element 105, the controlled element 107, and the controlled element 109. Then, the method proceeds to step 204. At this moment, the pairing candidate lists each corresponding to the controlled element 101, the controlled element 103, the controlled element 105, the controlled element 107, and the controlled element 109 are as shown in Table II below.

TABLE II

| Controlled Element | Paring Candidate List |
| --- | --- |
| controlled element 101 | electronic device 102, electronic device 106, electronic device 110 |
| controlled element 103 | electronic device 104, electronic device 108 |
| controlled element 105 | electronic device 102, electronic device 106, electronicdevice 110 |
| controlled element 107 | electronic device 104, electronic device 108 |
| controlled element 109 | electronic device 102, electronic device 106, electronic device 110 |

In step 204, since the pairing candidates lists each corresponding to the controlled element 101, the controlled element 103, the controlled element 105, the controlled element 107, and the controlled element 109 have more than one electronic device (as shown in Table II above), no controlled element is determined to be successfully paired yet. Then, the method proceeds to step 205.

In step 205, since no controlled element is determined to be successfully paired yet at this moment, the method just proceeds to step 206.

In step 206, since there are controlled elements (i.e., the controlled element 101, the controlled element 103, the controlled element 105, the controlled element 107, and the controlled element 109) not determined to be successfully paired yet, the method returns to step 201.

In step 201, the controlled element 101, the controlled element 103, the controlled element 105, the controlled element 107, and the controlled element 109 will be divided into the restart group and the force-shutdown group again. In this embodiment, the controlled element 101, the controlled element 103, the controlled element 105, the controlled element 107, and the controlled element 109 are sorted first, based on the similarity between the pairing candidate lists each corresponding to these controlled elements, such that the two controlled elements having higher similarity (i.e., the two pairing candidate lists having higher ratio of the same electronic devices) are arranged nearer from each other. In this example, in view of the pairing candidate lists each corresponding to the controlled element 101, the controlled element 105, and the controlled element 109 have the same electronic devices (i.e., the electronic device 102, the electronic device 106, and the electronic device 110, as shown in Table II above), while the pairing candidate lists each corresponding to the controlled element 103 and the controlled element 107 have the electronic devices (i.e., the electronic device 104 and the electronic device 108), the order of these controlled elements set to be "controlled element 101, controlled element 105, controlled element 109, controlled element 103, controlled element 107". The controlled element 101 at the first order, the controlled element 109 at the third order, and the controlled element 107 at the fifth order are then interweavingly assigned to the restart group, while the controlled element 105 at the second order and the controlled element 103 at the fourth order are assigned to the force-shutdown group. Then, the method proceeds to step 202.

In step 202, the remote pairing device 100 will send the restart command to the controlled element 101, the controlled element 107, and the controlled element 109 in the restart group, to cause the controlled element 101, the controlled element 107, and the controlled element 109 to perform the restart operation on the electronic device 102, the electronic device 108, and the electronic device 110 connected thereto respectively. The remote pairing device 100 will send the force-shutdown command to the controlled element 103 and the controlled element 105, to cause the controlled element 103 and the controlled element 105 to perform the restart operation on the electronic device 104 and the electronic device 106 connected thereto respectively. Then, the method proceeds to step 203.

During the second specific time period after sending the commands, the connection status corresponding to the electronic device 102, the electronic device 108, and the electronic device 110 received by the remote pairing device 100 will point to the restart operation but not the force-shutdown operation, while the connection status corresponding to the electronic device 104 and the electronic device 106 received by the remote pairing device 100 will point to the force-shutdown operation but not the restart operation. In view of the above, in step 203, the electronic device 104 and the electronic device 106 of which the connection status not pointing to the restart operation will be removed from the pairing candidate lists each corresponding to the controlled element 101, the controlled element 107, and the controlled element 109 in the restart group, while the electronic device 102, the electronic device 108, and the electronic device 110 of which the connection status not pointing to the force-shutdown operation will be removed from the pairing candidate lists each corresponding to the controlled element 103 and the controlled element 105 in the force-shutdown group. Then, the method proceeds to step 204. At this moment, the pairing candidate lists each corresponding to the controlled element 101, the controlled element 103, the controlled element 105, the controlled element 107, and the controlled element 109 are as shown in Table III below.

TABLE III

| Controlled Element | Paring Candidate List |
| --- | --- |
| controlled element 101 | electronic device 102, electronic device 110 |
| controlled element 103 | electronic device 104 |
| controlled element 105 | electronic device 106 |
| controlled element 107 | electronic device 108 |
| controlled element 109 | electronic device 102, electronic device 110 |

TABLE II

| Controlled Element | Paring Candidate List |
| --- | --- |
| controlled element 101 | electronic device 102, electronic device 110 |
| controlled element 103 | electronic device 104 |
| controlled element 105 | electronic device 106 |
| controlled element 107 | electronic device 108 |
| controlled element 109 | electronic device 102, electronic device 110 |

In step 204, since the pairing candidates lists each corresponding to the controlled element 103, the controlled element 105, and the controlled element 107 all have only one electronic device, the controlled element 103, the controlled element 105, and the controlled element 107 are determined to be successfully paired. In other words, at this moment, it is known that the controlled element 103 is paired with the electronic device 104, the controlled element 105 is paired with the electronic device 106, and the controlled element 107 is paired with the electronic device 108. Then, the method proceeds to step 205.

In step 205, the electronic device 104 paired with the controlled element 103, the electronic device 10 paired with the controlled element 105, and the electronic device 108 paired with the controlled element 107 are removed from the pairing candidate list corresponding to other controlled elements, and the controlled element 103, the controlled element 105, and the controlled element 107 are ruled out from subsequent calculation. Then, the method proceeds to step 206.

In step 206, since there are controlled elements (i.e., the controlled element 101 and the controlled element 109) not determined to be successfully paired yet, the method returns to step 201.

In step 201, the controlled element 101 and the controlled element 109 will be divided into the restart group and the force-shutdown group again. In this example, the controlled element 101 is assigned to the restart group, and the controlled element 109 is assigned to the force-shutdown group. Then, the method proceeds to step 202.

In step 202, the remote pairing device will send the restart command to the controlled element 101 in the restart group, to cause the controlled element 101 to perform the restart operation on the electronic device 102 connected thereto. The remote pairing device 100 will send the force-shutdown operation to the controlled element 109 in the force-shutdown group, to cause the controlled element 109 to perform the force-shutdown operation on the electronic device 110 connected thereto. Then, the method proceeds to step 203.

During the second specific time period after sending the commands, the connection status corresponding to the electronic device 102 received by the remote pairing device 100 will point to the restart operation but not the force-shutdown operation, while the connection status corresponding to the electronic device 110 received by the remote pairing device 100 will point to the force-shutdown operation but not the restart operation. In view of the above, in step 203, the electronic device 110 of which the connection status not pointing to the restart operation will be removed from the pairing candidate list corresponding to the controlled element 101 in the restart group, while the electronic device 102 of which the connection status not pointing to the force-shutdown operation will be removed from the pairing candidate list corresponding to the controlled element 109 in the force-shutdown group. Then, the method proceeds to step 204. At this moment, the pairing candidate lists each corresponding to the controlled element 101 and the controlled element 109 are as shown in Table IV below.

TABLE IV

| Controlled Element | Paring Candidate List |
| --- | --- |
| controlled element 101 | electronic device 102 |
| controlled element 109 | electronic device 110 |

In step 204, since the pairing candidates lists each corresponding to the controlled element 101 and the controlled element 109 both have only one electronic device, the controlled element 101 and the controlled element 109 are determined to be successfully paired. In other words, at this moment, it is known that the controlled element 101 is paired with the electronic device 102, and the controlled element 109 is paired with the electronic device 108. Then, the method proceeds to step 205.

In step 205, the electronic device 102 paired with the controlled element 101, and the electronic device 110 paired with the controlled element 109 are removed from the pairing candidate lists corresponding to other controlled elements, and the controlled element 101 and the controlled element 109 are ruled out from subsequent calculation. Then, the method proceeds to step 206.

In step 206, since the controlled element 101, the controlled element 103, the controlled element 105, the controlled element 107, and the controlled element 109 are all determined to be successfully paired, the remote pairing device 100 will end the pairing process.

As per the embodiments described above, the remote pairing device and method provided by the present disclosure allows the remote control site to figure out the pairing relationship between these controlled elements and the electronic devices when there are multiple controlled elements each set up on multiple electronic devices, so that the control commands from the remote site are transmitted to the correct electronic devices.

Ordinal terms used in the claims, such as "first," "second," "third," etc., are used to modify the elements appearing in the claims, and do not imply any prioritization, precedence relation, or a component is higher than the other component, or the chronological order in which the method steps are performed. The intention is to make a distinction between elements with the same name.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A remote pairing device, comprising a processor to execute:
    dividing a plurality of controlled elements into a restart group and a force-shutdown group, wherein the controlled elements are each set up on and connected to a mainboard of corresponding one of a plurality of electronic devices, and wherein each of the electronic devices and the controlled element connected thereto communicate with the remote pairing device via different networks;
    sending a restart command to the controlled elements in the restart group, to cause the controlled elements in the restart group to perform a restart operation on the electronic devices connected to the controlled elements in the restart group;
    sending a force-shutdown command to the controlled elements in the force-shutdown group, to cause the controlled elements in the force-shutdown group to perform a force-shutdown operation on the electronic devices connected to the controlled elements in the force-shutdown group;
    determining a plurality of pairing candidate lists each corresponding to the controlled elements, according to a plurality of connection statuses each corresponding to the electronic devices received during a specific time period after sending the restart command or the force-shutdown command; wherein each of the pairing candidate lists identify one or more of the electronic devices that are connected with the corresponding controlled element;
    determining that the controlled elements corresponding to the pairing candidates lists having only one of the electronic devices therein are successfully-paired;
    removing the only one of the electronic devices in the pairing candidate lists corresponding to the successfully paired controlled elements from the pairing candidate lists having a plurality of electronic devices therein, and ruling out the successfully paired controlled elements from subsequent consideration;
    iterating the above steps until all of the controlled elements are successfully paired;
    wherein in the initial iteration, determining the candidate lists each corresponding to the controlled elements comprises creating the candidate lists each corresponding to the controlled elements;
    wherein in subsequent iterations, determining the candidate lists each corresponding to the controlled elements comprises: determining whether each of the connection statuses corresponding to each of the electronic devices points to the restart operation or the force-shutdown operation:
    removing the electronic devices each corresponding to the connection status not pointing to the restart operation from the pairing candidate lists each corresponding to the controlled elements in the restart group; and
    removing the electronic devices each corresponding to the connection status not pointing to the force-shutdown operation from the pairing candidate lists each corresponding to the controlled elements in the force-shutdown group.

2. The remote pairing device as claimed in claim 1, wherein each of the connection statuses pointing to the restart operation comprises an online notification and an offline notification; and
    wherein each of the connection statuses pointing to the force-shutdown operation comprises an unknown notification, and does not comprise an online notification or an offline notification.

3. A remote pairing method, comprising:
    dividing a plurality of controlled elements into a restart group and a force-shutdown group, wherein the controlled elements are each set up on and connected to a mainboard of corresponding one of a plurality of electronic devices, and wherein each of the electronic devices and the controlled element connected thereto communicate with the remote pairing device via different networks;
    sending a restart command to the controlled elements in the restart group, to cause the controlled elements in the restart group to perform a restart operation on the electronic devices connected to the controlled elements in the restart group;
    sending a force-shutdown command to the controlled elements in the force-shutdown group, to cause the controlled elements in the force-shutdown group to perform a force-shutdown operation on the electronic devices connected to the controlled elements in the force-shutdown group;
    determining a plurality of pairing candidate lists each corresponding to the controlled elements, according to a plurality of connection statuses each corresponding to the electronic devices received during a specific time period after sending the restart command or the force-shutdown command; wherein each of the pairing candidate lists identify one or more of the electronic devices that are connected with the corresponding controlled element;

determining that the controlled elements corresponding to the pairing candidates lists having only one of the electronic devices therein are successfully-paired;

removing the only one of the electronic devices in the pairing candidate lists corresponding to the successfully paired controlled elements from the pairing candidate lists having a plurality of electronic devices therein, and ruling out the successfully paired controlled elements from subsequent consideration;

iterating the above steps until all of the controlled elements are successfully paired; wherein in the initial iteration, determining the candidate lists each corresponding to the controlled elements comprises creating the candidate lists each corresponding to the controlled elements;

wherein in subsequent iterations, determining the candidate lists each corresponding to the controlled elements comprises:

determining whether each of the connection statuses corresponding to each of the electronic devices points to the restart operation or the force-shutdown operation:

removing the electronic devices each corresponding to the connection status not pointing to the restart operation from the pairing candidate lists each corresponding to the controlled elements in the restart group; and removing the electronic devices each corresponding to the connection status not pointing to the force-shutdown operation from the pairing candidate lists each corresponding to the controlled elements in the force-shutdown group.

4. The remote pairing method as claimed in claim 3, wherein each of the connection statuses pointing to the restart operation comprises an online notification and an offline notification; and wherein each of the connection statuses pointing to the force-shutdown operation comprises an unknown notification, and does not comprise an online notification or an offline notification.

\* \* \* \* \*